(12) United States Patent
Takemoto et al.

(10) Patent No.: US 11,949,293 B2
(45) Date of Patent: Apr. 2, 2024

(54) ROTOR, METHOD FOR MANUFACTURING ROTOR, AND MOTOR

(71) Applicant: Nidec Corporation, Kyoto (JP)

(72) Inventors: Shinji Takemoto, Kyoto (JP); Tomoya Ueda, Kyoto (JP); Mitsuhiro Takemoto, Kyoto (JP); Yusuke Isogai, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 467 days.

(21) Appl. No.: 17/280,430

(22) PCT Filed: Sep. 26, 2019

(86) PCT No.: PCT/JP2019/037765
§ 371 (c)(1),
(2) Date: Mar. 26, 2021

(87) PCT Pub. No.: WO2020/067245
PCT Pub. Date: Apr. 2, 2020

(65) Prior Publication Data
US 2022/0006341 A1    Jan. 6, 2022

(30) Foreign Application Priority Data
Sep. 28, 2018    (JP) ................. 2018-185220

(51) Int. Cl.
*H02K 1/27*    (2022.01)
*H02K 1/2791*    (2022.01)
(Continued)

(52) U.S. Cl.
CPC ............. *H02K 1/2791* (2022.01); *H02K 1/28* (2013.01); *H02K 15/03* (2013.01)

(58) Field of Classification Search
CPC ... H02K 1/2786; H02K 1/2789; H02K 1/2791
See application file for complete search history.

(56) References Cited

U.S. PATENT DOCUMENTS

| 2005/0184610 A1* | 8/2005 | Agnes | H02K 1/2791 310/43 |
| 2009/0114020 A1* | 5/2009 | Yanohara | G01M 13/045 73/593 |

(Continued)

FOREIGN PATENT DOCUMENTS

| CN | 202488241 U | 10/2012 |
| CN | 104661897 A | 5/2015 |

(Continued)

OTHER PUBLICATIONS

WO-2017213134-A1 Machine Translation (Year: 2017).*
(Continued)

*Primary Examiner* — Tran N Nguyen
*Assistant Examiner* — Masoud Vaziri
(74) *Attorney, Agent, or Firm* — Keating & Bennett, LLP

(57) ABSTRACT

A rotor used in an outer rotor motor includes a rotor holder in a tubular shape extending along a center axis, a rotor core in a tubular shape extending in an axial direction and being fixed to a surface of the rotor holder, directed radially inward, and permanent magnets bonded to an inner circumferential surface of the rotor core and side by side in a circumferential direction. The rotor core includes projection portions projecting radially inward from the inner circumferential surface of the rotor core. One or more of the projection portions are in a gap between the permanent magnets adjacent to each other in the circumferential direction. Each of the projection portions has an axial length shorter than an axial length of each of the permanent magnets.

7 Claims, 4 Drawing Sheets

(51) Int. Cl.
H02K 1/28 (2006.01)
H02K 15/03 (2006.01)

(56) References Cited

U.S. PATENT DOCUMENTS

2009/0179517 A1* 7/2009 Lu .................... H02K 21/22
310/156.01
2013/0009494 A1* 1/2013 Oguma ................ H02K 1/2791
310/43
2015/0151783 A1 6/2015 Kitazume
2015/0244217 A1 8/2015 Shimamori

FOREIGN PATENT DOCUMENTS

| CN | 104868623 A | 8/2015 |
| EP | 1 237 252 A2 | 9/2002 |
| JP | 2012-217320 A | 11/2012 |
| JP | 2013-021826 A | 1/2013 |
| JP | 2015-159639 A | 9/2015 |
| JP | 5789504 B2 | 10/2015 |
| WO | 2017/213134 A1 | 12/2017 |

OTHER PUBLICATIONS

Official Communication issued in corresponding Chinese Patent Application No. 201980063257.2, dated Apr. 27, 2023.
Official Communication issued in International Patent Application No. PCT/JP2019/037765, dated Dec. 17, 2019.
Official Communication issued in corresponding Chinese Patent Application No. 202080056039.9, dated May 11, 2023.

* cited by examiner

ROTOR, METHOD FOR MANUFACTURING ROTOR, AND MOTOR

CROSS REFERENCE TO RELATED APPLICATION

This is a U.S. national stage of PCT Application No. PCT/JP2019/037765, filed on Sep. 26, 2019, and priority under 35 U.S.C. § 119(a) and 35 U.S.C. § 365(b) from Japanese Application No. 2018-185220, filed Sep. 28, 2018; the entire disclosures of which are incorporated herein by reference.

1. FIELD OF THE INVENTION

The present disclosure relates to a rotor, a method of manufacturing a rotor, and a motor.

2. BACKGROUND

As a rotor used for an outer rotor-type motor, a conventional rotor often includes a rotor core and a plurality of permanent magnets bonded to an inner circumferential surface of the rotor core.

In the conventional rotor, a permanent magnet is inserted into a recessed portion provided in the inner circumferential surface of the rotor core. Thus, when the permanent magnet is bonded to the rotor core, an adhesive needs to be individually applied to a plurality of recessed portions of the rotor core, and thus manufacturing the rotor takes time.

SUMMARY

According to an example embodiment of the present disclosure, a rotor is used in an outer rotor motor and includes a rotor holder in a tubular shape extending along a center axis. The rotor includes a rotor core in a tubular shape extending in an axial direction and being fixed to a surface of the rotor holder, facing radially inward. The rotor includes permanent magnets that are bonded to an inner circumferential surface of the rotor core and positioned side by side in a circumferential direction. The rotor core includes projection portions projecting radially inward from the inner circumferential surface of the rotor core. One or more of the projection portions are in a gap between the permanent magnets adjacent to each other in the circumferential direction. Each of the projection portions has an axial length shorter than an axial length of each of the permanent magnets.

According to an example embodiment of the present disclosure, a rotor is used in an inner rotor motor and includes a rotor core extending along a center axis. The rotor includes permanent magnets that are bonded to an outer circumferential surface of the rotor core and positioned side by side in the circumferential direction. The rotor core includes projection portions projecting radially outward from the outer circumferential surface of the rotor core. One or more of the projection portions are in a gap between the permanent magnets adjacent to each other in the circumferential direction. Each of the projection portions has an axial length shorter than an axial length of each of the permanent magnets.

An example embodiment of the present disclosure is a method of manufacturing a rotor used in an outer rotor motor, the rotor including a rotor holder in a tubular shape extending along a center axis. The rotor includes a rotor core in a tubular shape extending in an axial direction and being fixed to a surface of the rotor holder, facing radially inward. The rotor includes permanent magnets that are bonded to an inner circumferential surface of the rotor core and positioned side by side in a circumferential direction. The rotor core includes projection portions projecting radially inward from the inner circumferential surface of the rotor core. One or more of the projection portions are in a gap between the permanent magnets adjacent to each other in the circumferential direction. Each of the projection portions has an axial length shorter than an axial length of each of the permanent magnets. In the step of bonding the permanent magnets to the rotor core, after an adhesive continuous in the circumferential direction is applied to a region of the inner circumferential surface of the rotor core, the region being provided with no projection portion, the permanent magnets are on the inner circumference of the rotor core.

The above and other elements, features, steps, characteristics and advantages of the present disclosure will become more apparent from the following detailed description of the example embodiments with reference to the attached drawings.

DETAILED DESCRIPTION

Each drawing shows Z-axis direction that is a vertical direction in which a positive side is an upper side and a negative side is a lower side. Each drawing appropriately shows a central axis J that is a virtual line having an axial direction parallel to the Z-axis direction, or the vertical direction. In the following description, unless otherwise described, a direction parallel to an axial direction of the center axis J is simply referred to as the term "axial direction", "axial", or "axially", radial directions centered on the center axis J are each simply referred to as the term "radial direction", "radial", or "radially", and a circumferential direction about the center axis J is simply referred to as the term "circumferential direction", "circumferential", or "circumferentially".

In example embodiments of the present disclosure, the lower side corresponds to one side in the axial direction, and the upper side corresponds to the other side in the axial direction. The upper side and the lower side are simply names for describing a relative positional relationship of each part, and an actual placement relationship may be other than the placement relationship indicated by these names.

Figure 1:
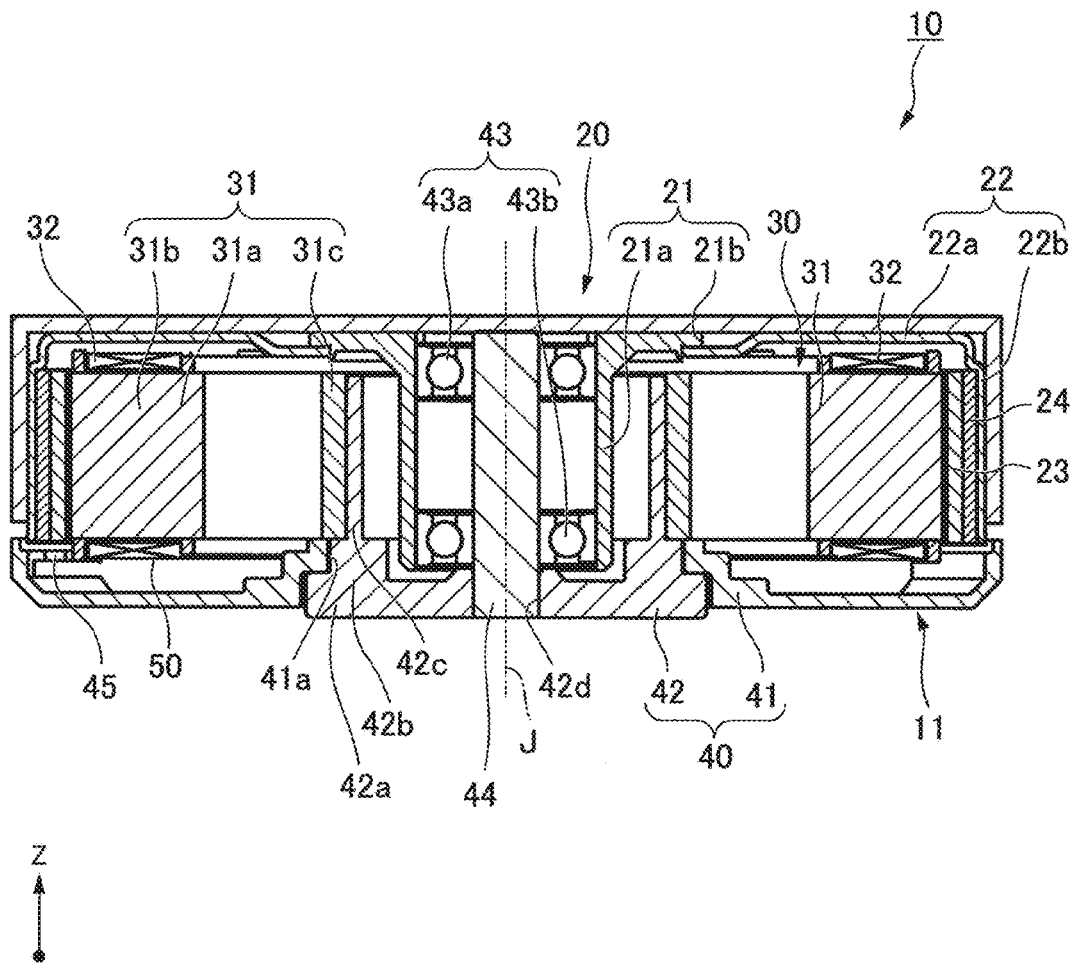
FIG. 1 is a sectional view illustrating a motor according to an example embodiment of the present disclosure.

FIG. 1 is a sectional view illustrating a motor according to an example embodiment of the present disclosure. As illustrated in FIG. 1, a motor 10 of the example embodiment of the present disclosure is an outer rotor-type motor. The motor 10 has a fixing portion 11 and a rotor 20. The fixing portion 11 includes a stator 30, a bracket 40, and a circuit board 50.

The bracket 40 includes a circuit-board support part 41, a stator holding part 42, a bearing part 43, and a shaft 44. That is, the motor 10 has the circuit-board support part 41, the stator holding part 42, the bearing part 43, and the shaft 44.

The circuit-board support part 41 is a case body in an annular shape opening upward. The circuit-board support part 41 has a bottom surface in an annular plate shape with a plate surface orthogonal to the axial direction. The circuit-board support part 41 is provided inside with the circuit board 50 in the shape of a plate extending in a direction orthogonal to the center axis J. The circuit board 50 faces a part of the rotor 20 and the stator 30 in the axial direction. The circuit-board support part 41 has a central hole 41a passing through the circuit-board support part 41 in the axial direction. Although not illustrated, the central hole 41a has a circular shape about the central axis J when viewed in the axial direction.

The stator holding part 42 has a base portion 42a extending radially outward from the center axis J, a case fixing portion 42b in a cylindrical shape extending upward from an upper surface of the base portion 42a, and a stator fixing portion 42c in a cylindrical shape extending upward from an upper surface of the case fixing portion 42b. The base portion 42a has an annular plate shape about the center axis J. The base portion 42a is provided at its central portion viewed in the axial direction with a shaft fixing hole 42d passing through the base portion 42a in the axial direction. The shaft 44 is fixed at its lower end to the shaft fixing hole 42d. The shaft 44 is in a columnar shape extending in the vertical direction about the center axis J.

The case fixing portion 42b and the stator fixing portion 42c are each in a cylindrical shape about the center axis J. The central hole 41a of the circuit-board support part 41 is fixed to an outer circumferential surface of the case fixing portion 42b. The case fixing portion 42b and the central hole 41a can be fixed to each other by press fitting or bonding. To the stator fixing portion 42c, a stator core 31 described later is fixed.

The bearing part 43 in the example embodiment of the present disclosure includes two ball bearings 43a and 43b. The bearing part 43 may include a slide bearing in a cylindrical shape. The shaft 44 is inserted into an inner ring of each of the ball bearings 43a and 43b. A wave washer is inserted between the ball bearings 43a and 43b disposed parallel in the axial direction. The ball bearings 43a and 43b each have an outer ring that supports the rotor 20.

The rotor 20 includes a hub 21, a rotor holder 22, a rotor magnet 23, and a rotor core 24. The hub 21 has a cylindrical portion 21a extending along the center axis J and a connecting portion 21b in the shape of a disk extending radially outward from an outer circumferential surface of the cylindrical portion 21a. The cylindrical portion 21a houses inside the ball bearings 43a and 43b supported by the shaft 44. The rotor 20 is rotatably supported about the center axis J by the ball bearings 43a and 43b.

The rotor holder 22 is fixed to an outer peripheral end of the connecting portion 21b of the hub 21. The rotor holder 22 has a cover portion 22a and a tubular portion 22b. The cover portion 22a is in the shape of an annular plate when viewed in the axial direction. The connecting portion 21b of the hub 21 in the example embodiment of the present disclosure is fitted and fixed in a central through-hole of the cover portion 22a. The rotor holder 22 is configured to cover the upper side of the stator 30.

The tubular portion 22b is in a tubular shape extending downward from a radially outer peripheral edge of the cover portion 22a. The tubular portion 22b is in a cylindrical shape about the center axis J. The rotor core 24 is fixed to an inner circumferential surface of the tubular portion 22b. The rotor magnet 23 is a permanent magnet and is adhesively fixed to an inner circumferential surface of the rotor core 24. The rotor magnet 23 and the rotor core 24 face an upper surface of the circuit board 50 in the axial direction with a gap therebetween.

Figure 2:
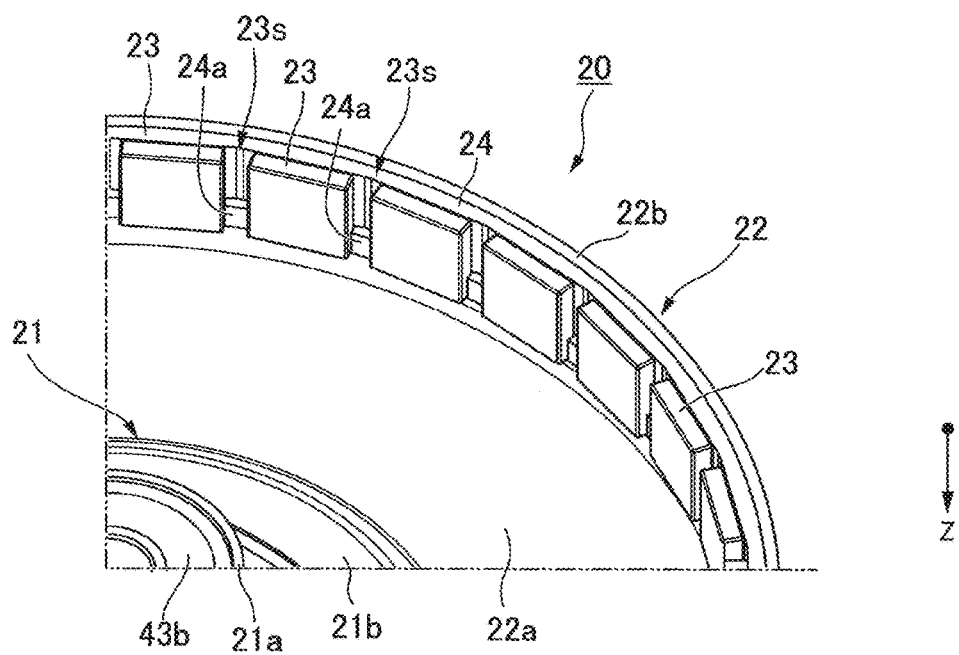
FIG. 2 is a perspective view of a rotor according to an example embodiment of the present disclosure as viewed from below.
Figure 3:
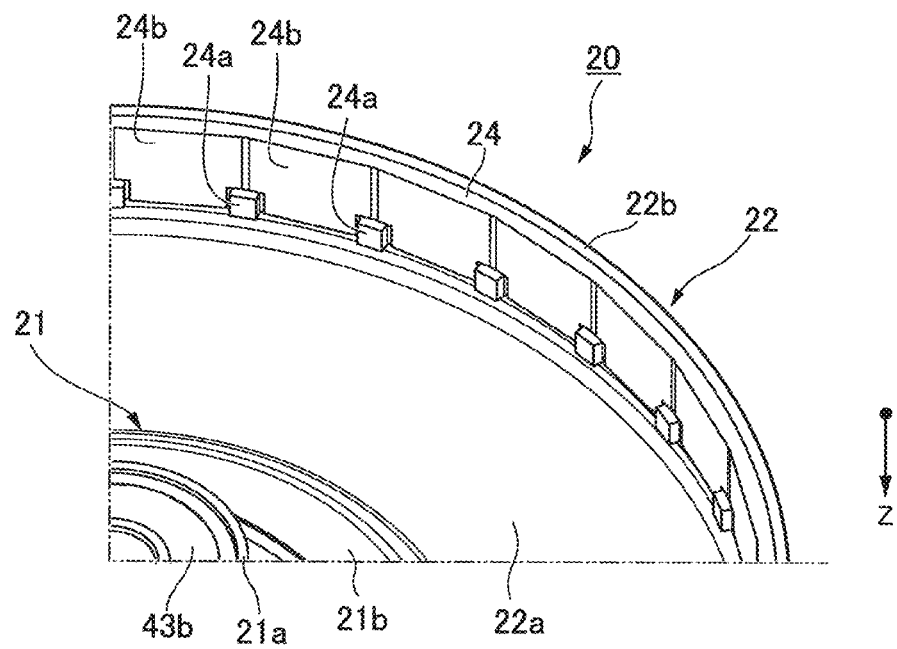
FIG. 3 is a perspective view illustrating a state in which a rotor magnet is removed.

FIG. 2 is a perspective view of the rotor 20 as viewed from below. FIG. 3 is a perspective view illustrating a state of the rotor 20 in which the rotor magnet 23 is removed. As illustrated in FIG. 3, the rotor core 24 is in a cylindrical shape extending in the circumferential direction along the tubular portion 22b of the rotor holder 22. The rotor core 24 is provided on its inner circumferential surface with a plurality of projection portions 24a disposed at equal intervals in the circumferential direction. Each of the projection portions 24a projects radially inward from the inner circumferential surface of the rotor core 24. Between the projection portions 24a adjacent to each other in the circumferential direction, the inner circumferential surface of the rotor core 24 is a flat portion 24b extending in a direction orthogonal to the radial direction. A plurality of flat portions 24b is disposed at equal intervals in the circumferential direction. The rotor magnet 23 in the shape of a rectangular plate is bonded to each of the flat portions 24b.

The rotor core 24 in the example embodiment of the present disclosure is a laminated steel sheet in which a plurality of electromagnetic steel sheets is laminated in thickness direction. When the electromagnetic steel sheets to be laminated are changed in shape, the projection portions 24a on the inner circumferential surface of the rotor core 24 can be easily changed in position and axial length.

On the inner circumferential surface of the rotor core 24, the plurality of rotor magnets 23 is disposed at intervals in the circumferential direction. Each of the projection portions 24a is disposed between the rotor magnets 23 adjacent to each other. That is, the plurality of rotor magnets 23 and the plurality of projection portions 24a are disposed alternately in the circumferential direction. In the rotor 20, each rotor magnet 23 is positioned in the circumferential direction by two projection portions 24a across the rotor magnet 23 in the circumferential direction.

Each of the projection portions 24a has an axial length shorter than an axial length of each of the rotor magnets 23. That is, the projection portions 24a are each partially disposed in the axial direction in a gap 23s between the corresponding rotor magnets 23 adjacent to each other in the circumferential direction. One or more of the projection portions 24a are disposed in each gap 23s of the rotor 20.

The projection portion 24a of the example embodiment of the present disclosure is located on an upper end portion of the inner circumferential surface of the rotor core 24 in the axial direction. That is, the rotor holder 22 has the cover portion 22a extending radially inward from one end in the axial direction, and the projection portions 24a are each located in an end portion close to the cover portion 22a on the inner circumferential surface of the rotor core 24. This structure enables the rotor 20 of the example embodiment of the present disclosure to be reduced in manufacturing process time. Details will be described below.

Figure 4:
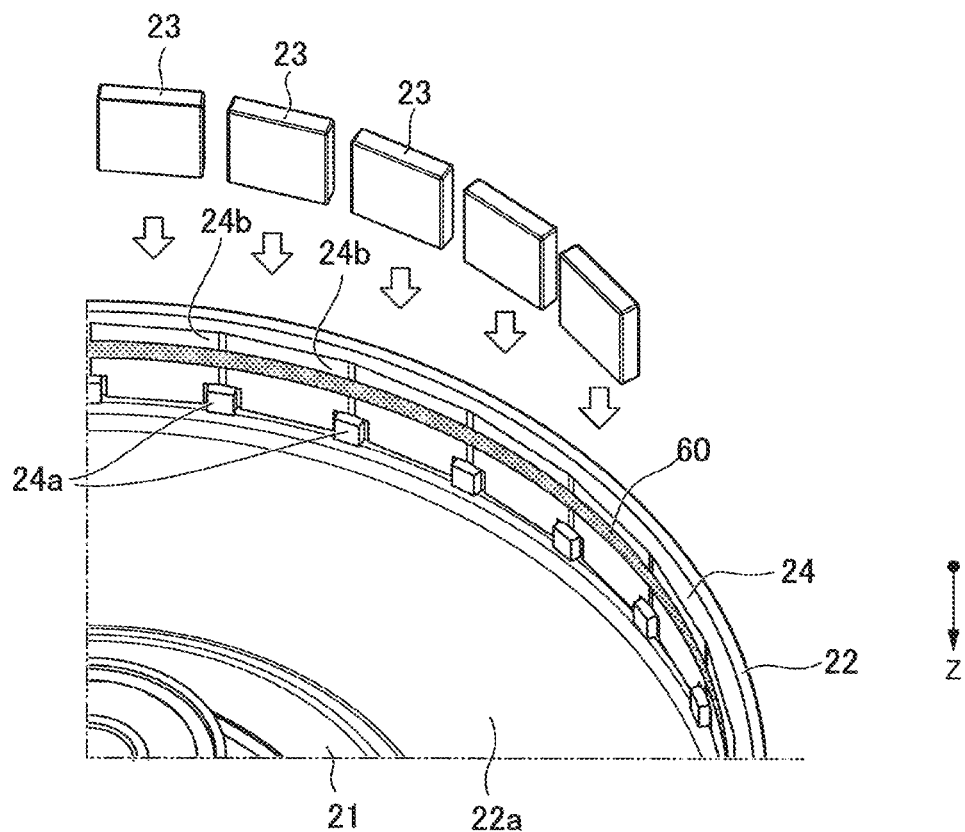
FIG. 4 is an explanatory view illustrating the step of bonding a rotor magnet.

FIG. 4 is an explanatory view illustrating the step of bonding the rotor magnet 23. In the step of manufacturing the rotor 20 of the example embodiment of the present disclosure, first, the rotor core 24 in a cylindrical shape is fixed to the tubular portion 22b of the rotor holder 22 by press fitting or bonding. Examples of a press-fitting method include shrink-fitting and cold-fitting.

After that, an adhesive 60 is applied to the inner circumferential surface of the rotor core 24. At this time, the rotor core 24 of the example embodiment of the present disclosure is configured such that the projection portions 24a are not provided on the inner circumferential surface of the rotor core 24 in a region close to an opening of the rotor holder 22. This causes the region provided with no projection portion 24a to be connected over one circumference in the circumferential direction on the inner circumferential surface of the rotor core 24. When such a substantially flat region connected over one circumference is provided, the adhesive 60 can be applied in a continuous manner in the circumferential direction as illustrated in FIG. 4.

The region coated with the adhesive 60 in the example embodiment of the present disclosure is a substantially flat region where no projection portion 24a is provided, so that the adhesive 60 can be applied with a single stroke by a coating device such as a dispenser. Thus, the step of applying the adhesive 60 is significantly shortened as compared with a case where the adhesive is individually applied to the plurality of flat portions 24b. The structure of the rotor 20 and the method for manufacturing the rotor 20 of the example embodiment of the present disclosure enables reduction in manufacturing process time.

The rotor core 24 of the example embodiment of the present disclosure is configured such that the projection portions 24a are disposed near the cover portion 22a axially apart from the opening of the rotor holder 22 as illustrated in FIG. 4. This structure allows the adhesive 60 to be applied to a region near the opening of the rotor holder 22 as illustrated in FIG. 4. Thus, when the rotor magnet 23 is inserted between the projection portions 24a, the adhesive 60 can be spread on the flat portion 24b by the rotor magnet 23. As a result, a bonding area between the rotor magnet 23 and the rotor core 24 is increased, so that bonding strength between the rotor magnet 23 and the rotor core 24 is improved.

The rotor 20 of the example embodiment of the present disclosure has the adhesive 60 continuous in the circumferential direction, being provided on the inner circumferential surface of the rotor core 24, as illustrated in FIG. 4. In contrast, the rotor magnets 23 are disposed apart from each other at equal intervals in the circumferential direction. Thus, the rotor 20 has the adhesive 60 that is partially exposed in the gap 23s between the rotor magnets 23 adjacent to each other. When the adhesive 60 is partially disposed in the gap 23s, a side surface of the rotor magnet 23 facing the circumferential direction and the inner circumferential surface of the rotor core 24 can be bonded to each other inside the gap 23s. However, when the adhesive 60 located in the gap 23s protrudes radially inward from the rotor magnet 23, it may interfere with the stator 30. Thus, the amount of coating is preferably adjusted within a range that can be accommodated inside the gap 23s.

As illustrated in FIG. 1, the stator 30 is disposed above the circuit-board support part 41. The stator 30 radially faces the rotor 20 with a gap therebetween. The stator 30 includes the stator core 31 and a plurality of coils 32. The stator core 31 radially faces the rotor magnet 23 and the rotor core 24 with a gap therebetween. The stator core 31 includes a core back 31a, a plurality of teeth 31b, and a connecting portion 31c.

The core back 31a is in an annular shape extending in the circumferential direction. The core back 31a is in a circular shape about the center axis J. The connecting portion 31c is a spoke-shaped portion extending radially inward from the core back 31a. The connecting portion 31c has a radially inner end that is in a circular shape when viewed in the axial direction. The connecting portion 31c is fixed to an outer circumferential surface of the stator fixing portion 42c. This allows the stator 30 to be fixed to the bracket 40.

The plurality of teeth 31b extends radially outward from the core back 31a. The plurality of teeth 31b is disposed at equal intervals over one circumference in the circumferential direction. The plurality of coils 32 is mounted on the stator core 31. More specifically, the coils 32 are mounted on the corresponding teeth 31b. Between a coil 32 and a tooth 31b, a resin insulator may be disposed. The coil 32 is formed by winding a coil wire around the tooth 31b. Although not illustrated, the coil wire constituting the coil 32 has an end extending downward from the coil 32 and being connected to the circuit board 50.

The circuit board 50 is in the shape of a plate having a plate surface orthogonal to the axial direction. The circuit board 50 is disposed below the stator 30. The circuit board 50 in the example embodiment of the present disclosure is fixed to an upper surface of the circuit-board support part 41. The circuit board 50 has the upper surface on which a plurality of Hall sensors is mounted. The circuit board 50 has the upper and lower surfaces on which an inverter circuit, a power supply circuit, or the like may be mounted.

The Hall sensors 45 detect leakage flux from the corresponding rotor magnets 23 when the rotor 20 rotates. Three Hall sensors 45 are disposed at equal angles in the circumferential direction. The Hall sensors 45 are disposed every 30° in the circumferential direction, for example. The Hall sensors 45 may be disposed at a pitch of every 60° or every 120°.

The motor 10 of the example embodiment of the present disclosure described above includes the rotor 20 that can be efficiently manufactured, and thus can be efficiently manufactured in a short time.

Figure 5:
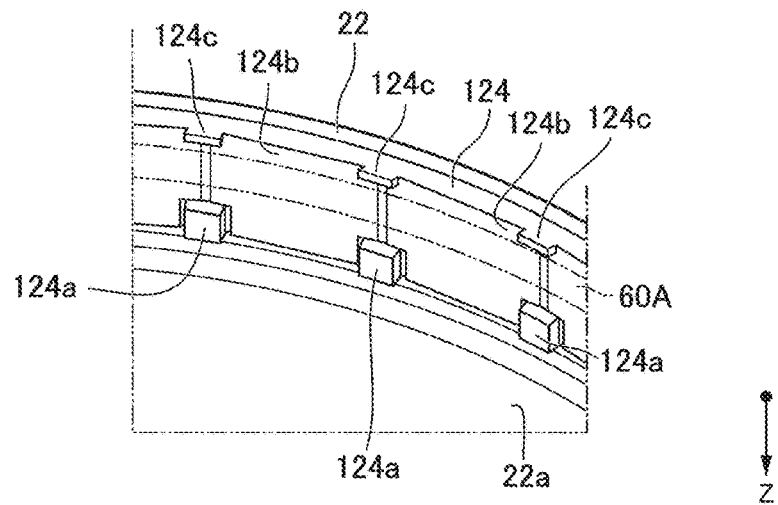
FIG. 5 is a partial perspective view illustrating a rotor core of a first modification of an example embodiment of the present disclosure.

FIG. 5 is a partial perspective view illustrating a rotor core 124 of a first modification. The rotor core 124 of the first modification can be used in place of the rotor core 24 illustrated in FIGS. 1 to 4. As illustrated in FIG. 5, the rotor core 124 has a plurality of projection portions 124a and 124c projecting radially inward from its inner circumferential surface. A flat portion 124b to which the rotor magnet 23 is bonded is disposed between the projection portions 124a adjacent to each other in the circumferential direction and between the projection portions 124c adjacent to each other therein.

When viewed in the radial direction, the projection portions 124a and the projection portions 124c are disposed on both sides of the flat portion 124b. Each of the projection portions 124a is disposed in an end portion of an inner circumferential surface of the rotor core 124 close to the cover portion 22a. The projection portions 124c are located below the corresponding projection portions 124a in the axial direction. Each of the projection portions 124c is disposed in a lower end portion of the inner circumferential surface of the rotor core 124. The projection portions 124a and 124c overlapping each other when viewed in the axial direction are disposed apart from each other in the axial direction. Thus, the rotor provided with the rotor core 124 of the first modification includes the multiple projection portions 124a and the multiple projection portions 124c that are disposed apart from each other in the axial direction in respective gaps between the corresponding rotor magnets 23 adjacent to each other in the circumferential direction.

The rotor core 124 of the first modification includes the multiple projection portions 124a and the multiple projection portions 124c that are arranged in the respective gaps between the corresponding rotor magnets 23 adjacent to each other, so that the rotor magnets 23 can be fixed more accurately. Thus, when the rotor core 124 is used, the motor 10 can be improved in torque and reduced in noise.

The rotor core 124 of the first modification includes the projection portions 124a and 124c disposed adjacent to each other in the axial direction while being apart from each other, so that the rotor core 124 is provided in its inner circumferential surface with substantially flat regions that are not provided with the projection portions 124a and 124c, and that are connected over one circumference in the circumferential direction. This allows the rotor core 124 of the first modification to have an adhesive coating region 60A connected in a continuous manner in the circumferential direction. Thus, the rotor core 124 of the first modification also enables the adhesive 60 to be applied in a continuous manner in the circumferential direction, and enables the step of bonding the rotor magnets 23 to be shortened.

Figure 6:
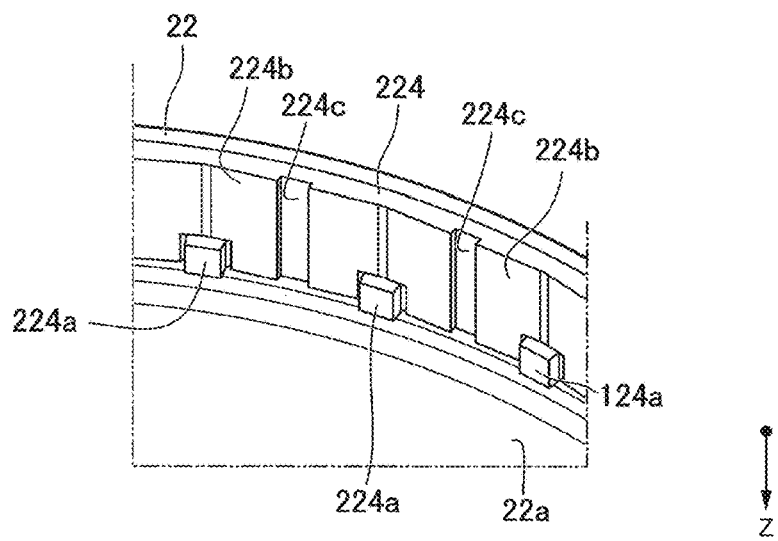
FIG. 6 is a partial perspective view illustrating a rotor core of a second modification of an example embodiment of the present disclosure.

FIG. 6 is a partial perspective view illustrating a rotor core 224 of a second modification. The rotor core 224 of the second modification can be used in place of the rotor core 24 illustrated in FIGS. 1 to 4. As illustrated in FIG. 6, the rotor core 224 has a plurality of projection portions 224a projecting radially inward from its inner circumferential surface. A flat portion 224b to which a rotor magnet 23 is bonded is disposed between the projection portions 224a adjacent to each other in the circumferential direction. Each flat portion 224b is provided in its central portion in the circumferential direction with a recessed groove 224c being recessed radially outward from the flat portion 224b and extending along the axial direction. That is, the rotor core 224 has the recessed groove 224c extending along the axial direction in a region where the rotor magnet 23 is bonded.

The rotor core 224 of the second modification also enables the adhesive 60 to be applied to a region, where the projection portion 224a is not provided, in a continuous manner in the circumferential direction, as with the rotor core 24 illustrated in FIG. 4. Thus, even when the rotor core 224 of the second modification is used, manufacturing process time of a rotor can be shortened. Then, when the recessed groove 224c is provided in the example embodiment of the present disclosure, the adhesive 60 applied to an inner circumferential surface of the rotor core 224 can be wetted and spread in the axial direction along the recessed groove 224c. This enables a bonding area between the rotor magnet 23 and the inner circumferential surface of the rotor core 224 to be widened, and enables bonding strength to be increased.

The rotor core 224 of the second modification includes the recessed groove 224c that causes increase in unevenness of the region to which the adhesive is applied. However, the recessed groove 224c is recessed radially outward from the flat portion 224b, and thus does not cause poor application of the adhesive 60 in the flat portion 224b that is a main bonding region of the rotor magnet 23.

Figure 7:
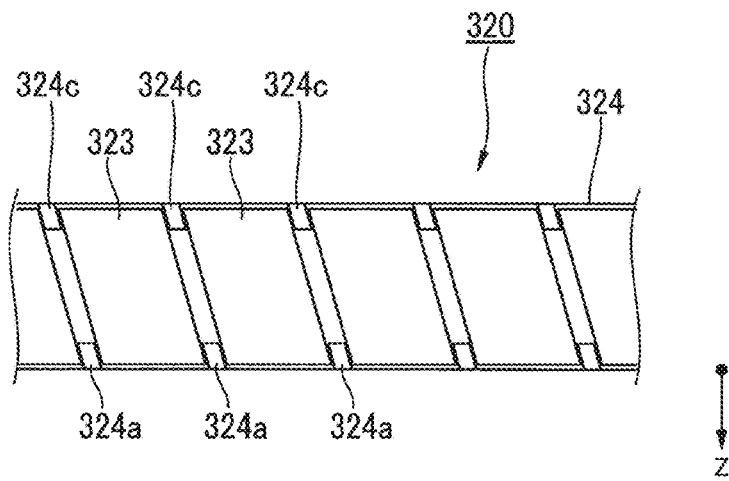
FIG. 7 is a partial plan view illustrating a rotor of a third modification of an example embodiment of the present disclosure.

FIG. 7 is a partial plan view illustrating a rotor 320 of a third modification including a rotor core 324 and a rotor magnet 323. FIG. 7 is a plan view of the rotor 320 viewed from radially inside to radially outside. The rotor 320 of the third modification can be used in place of the rotor 20 illustrated in FIGS. 1 to 4. As illustrated in FIG. 7, the rotor core 324 has a plurality of projection portions 324a and a plurality of projection portions 324c that project radially inward from its inner circumferential surface. The rotor magnet 323 in the shape of a parallelogram is fixed between the projection portions 324a adjacent to each other in the circumferential direction and between the projection portions 324c adjacent to each other therein.

The projection portion 324a and the projection portion 324c disposed in a gap between the rotor magnets 323 adjacent to each other are also disposed apart from each other in the axial direction in the third modification, so that the adhesive 60 can be applied to the inner circumferential surface of the rotor core 324 in a continuous manner in the circumferential direction, as in the example embodiment. Thus, the rotor 320 also can be manufactured in a short time as with the rotor 20 of the example embodiment.

Figure 8:
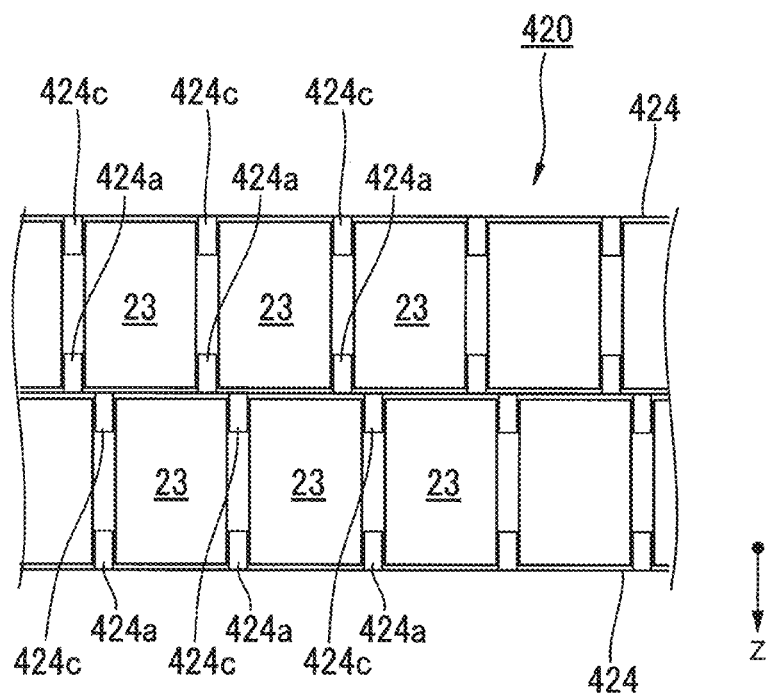
FIG. 8 is a partial plan view illustrating a rotor of a fourth modification of an example embodiment of the present disclosure.

FIG. 8 is a partial plan view illustrating a rotor 420 of a fourth modification including a rotor core 424. FIG. 8 is a plan view of the rotor 420 viewed from radially inside to radially outside. The rotor 420 of the fourth modification can be used in place of the rotor 20 illustrated in FIGS. 1 to 4.

The rotor 420 has two rotor cores 424 arranged in respective two upper and lower stages, and a plurality of rotor magnets 23 bonded to each of the rotor cores 424. Each of the rotor cores 424 has a plurality of projection portions 424a and a plurality of projection portions 424c that project radially inward from its inner circumferential surface. The rotor magnet 23 in a rectangular shape when viewed in the radial direction is fixed between the projection portions 424a adjacent to each other in the circumferential direction and between the projection portions 424c adjacent to each other therein.

The projection portion 424a and the projection portion 424c disposed in a gap between the rotor magnets 23 adjacent to each other in each of the rotor cores 424 are also disposed apart from each other in the axial direction in the fourth modification, so that the adhesive 60 can be applied to the inner circumferential surface of each of the rotor cores 424 in a continuous manner in the circumferential direction, as in the example embodiment. Thus, the rotor 420 also can be manufactured in a short time as with the rotor 20 of the example embodiment.

The rotor core 424 may be formed including only the projection portion 424a at one axial end, or only the projection portion 424c.

Figure 9:
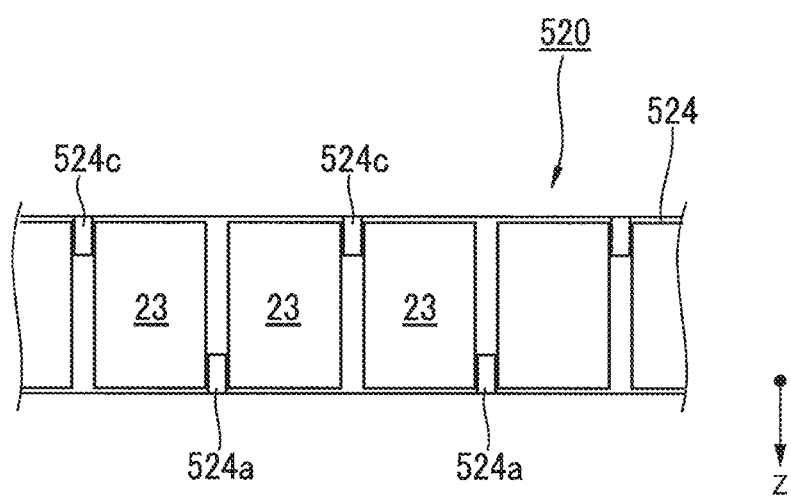
FIG. 9 is a partial plan view illustrating a rotor of a fifth modification of an example embodiment of the present disclosure.

FIG. 9 is a partial plan view illustrating a rotor 520 of a fifth modification including a rotor core 524. FIG. 9 is a plan view of the rotor 520 viewed from radially inside to radially outside. The rotor 520 of the fifth modification can be used in place of the rotor 20 illustrated in FIGS. 1 to 4.

The rotor 520 has a rotor core 524 and a plurality of rotor magnets 23 bonded to the rotor core 524. The rotor core 524 has a plurality of projection portions 524a and a plurality of projection portions 524c that project radially inward from its inner circumferential surface. The fifth modification allows only the projection portion 524a or only the projection portion 524c to be disposed in a gap between the rotor magnets 23 adjacent to each other in the circumferential direction. The fifth modification also enables the adhesive 60 to be applied to a substantially flat region, where the projection portions 524a and 524c are not provided, on the inner circumferential surface of the rotor core 524 in a continuous manner in the circumferential direction. Thus, the rotor 320 also can be manufactured in a short time as with the rotor 20 of the example embodiment.

The fifth modification may be configured such that the projection portions 524a and 524c are further extended in the axial direction. When the projection portions 524a and 524c overlap each other in the circumferential direction, the adhesive 60 may be applied in a meandering manner in the circumferential direction. The fifth modification can be configured by combining the configurations of the second to fourth modifications.

Although in the above example embodiments and modifications, the rotor used for an outer rotor-type motor has been described, the technical idea of the present disclosure is also applicable to a rotor used for an inner rotor-type motor. That is, a rotor may be used in an inner rotor-type motor and include a rotor core extending along a center axis, and a plurality of permanent magnets that is bonded to an outer circumferential surface of the rotor core and disposed side by side in the circumferential direction, wherein the rotor core has a plurality of projection portions projecting radially outward from the outer circumferential surface of the rotor core, one or more of the projection portions are disposed in a gap between the permanent magnets adjacent to each other in the circumferential direction, and each of the projection portions has an axial length shorter than an axial length of each of the permanent magnets.

When the rotor is used for an inner rotor-type motor, the permanent magnet is bonded to an outer circumferential surface of the rotor core. When any of the configurations of the above example embodiments or modifications is applied to a bonded portion between the rotor core and the permanent magnet, manufacturing process time of a rotor can be shortened. When a motor is provided with a rotor of an inner rotor-type motor, the motor can be efficiently manufactured.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor used in an outer rotor motor, the rotor comprising:
   a rotor holder in a tubular shape extending along a center axis;
   a rotor core in a tubular shape extending in an axial direction and being fixed to a surface of the rotor holder, directed radially inward; and
   permanent magnets that are bonded to an inner circumferential surface of the rotor core and positioned side by side in a circumferential direction; wherein
   the rotor core is defined by a plurality of electromagnetic steel sheets laminated in a thickness direction and includes projection portions projecting radially inward from the inner circumferential surface of the rotor core;
   the projection portions are defined by portions of the plurality of electromagnetic steel sheets, with only some of the plurality of electromagnetic steel sheets defining the projection portions;
   one or more of the projection portions are located in a gap between ones of the permanent magnets that are adjacent to each other in the circumferential direction;
   each of the projection portions has an axial length shorter than an axial length of each of the permanent magnets;
   the rotor includes a lid extending radially inward from one end of the rotor in the axial direction;
   among two of the projection portions which are spaced apart from one another in the axial direction, a projection portion that is farther from the lid has a shorter axial length than an axial length of a projection portion which is closer to the lid in the axial direction.

2. The rotor according to claim 1, further comprising:
   an adhesive connected in a continuous manner in the circumferential direction on the inner circumferential surface of the rotor core.

3. The rotor according to claim 1, wherein
   the rotor holder includes a cover portion extending radially inward from one end of the rotor holder in the axial direction; and
   the projection portions are located in an end portion on the inner circumferential surface of the rotor core.

4. The rotor according to claim 1, further comprising:
   the two of the projection portions which are space apart from one another in the axial direction are located in a gap between the permanent magnets adjacent to each other in the circumferential direction.

5. The rotor according to claim 1, wherein the rotor core includes a recessed groove extending in the axial direction in a region to which each of the permanent magnets is bonded.

6. A motor comprising:
   the rotor according to claim 1.

7. The rotor according to claim 1, wherein
   the rotor core includes recessed grooves on two sides of the projection portions in the circumferential direction, the recessed grooves are recessed radially outwardly.

* * * * *